United States Patent
Scott

(10) Patent No.: US 9,868,565 B2
(45) Date of Patent: Jan. 16, 2018

(54) GABION DEPLOYMENT PLATFORM

(71) Applicant: Hesco Bastion Limited, Leeds Yorkshire (GB)

(72) Inventor: Kenny Scott, Kelty Fife (GB)

(73) Assignee: Hesco Bastion Limited, Leeds Yorkshire (GB)

( * ) Notice: Subject to any disclaimer, the term of this patent is extended or adjusted under 35 U.S.C. 154(b) by 367 days.

(21) Appl. No.: 14/371,168

(22) PCT Filed: Dec. 28, 2012

(86) PCT No.: PCT/GB2012/053275
§ 371 (c)(1),
(2) Date: Jul. 8, 2014

(87) PCT Pub. No.: WO2013/104887
PCT Pub. Date: Jul. 18, 2013

(65) Prior Publication Data
US 2015/0016896 A1    Jan. 15, 2015

(30) Foreign Application Priority Data

Jan. 11, 2012 (GB) .................................. 1200401.6
Jul. 2, 2012 (GB) .................................. 1211707.3
(Continued)

(51) Int. Cl.
*E02B 3/08* (2006.01)
*B65D 19/00* (2006.01)
(Continued)

(52) U.S. Cl.
CPC ........ *B65D 19/0002* (2013.01); *B62B 15/007* (2013.01); *B65D 19/02* (2013.01);
(Continued)

(58) Field of Classification Search
CPC ............ E02D 29/0208; B65D 19/0002; B65D 19/02; B65C 19/0002; B65C 19/02
(Continued)

(56) References Cited

U.S. PATENT DOCUMENTS 3,938,678 A * 2/1976 Kern ..................... B65G 67/20
                                                              108/55.1
5,022,538 A * 6/1991 Richmond ............ A47F 5/0876
                                                                211/107
(Continued)

FOREIGN PATENT DOCUMENTS

EP    0466726 B1    11/1995
EP    1951963 B1    6/2009
(Continued)

OTHER PUBLICATIONS

International Search Report mailed in PCT/GB2012/053275 dated Jul. 25, 2013.

*Primary Examiner* — Sunil Singh
(74) *Attorney, Agent, or Firm* — Dilworth IP LLC

(57) ABSTRACT

The present invention relates to a gabion deployment platform for storing a folded multi-compartment gabion and from which the gabion can be deployed, the deployment platform comprising: a base element for supporting the folded multi-compartmental gabion, the base element comprising a first member configured to extend along at least a part of a first side of said folded multi-compartment gabion, and a second member, extending transversely from said first member, said second member configured to extend along at least a part of a second side of said folded multi-compartmental gabion; and at least one retaining element, coupled at a first end thereof to said base element, said at least one retaining element being releasably attached, connected or retentively engaged, at least at one point of said at least one retaining element, by way of at least one releasable attach- (Continued)

ing, connecting or retentive engaging means, to a portion of a compartment of said folded multi-compartment gabion, said at least one retaining element configured to extend from said base element, over at least a portion of said folded multi-compartment gabion, said at least one retaining element serving to attach, connect or retentively engage a part of the gabion to the base element when the gabion is folded but to release the gabion from the base element when the gabion is deployed.

1 Claim, 11 Drawing Sheets

(30) Foreign Application Priority Data

Jul. 6, 2012 (GB) .................................. 1212085.3
Aug. 31, 2012 (GB) .................................. 1215556.0

(51) Int. Cl.
*E02D 29/02* (2006.01)
*B62B 15/00* (2006.01)
*B65D 19/02* (2006.01)
*B65D 19/44* (2006.01)

(52) U.S. Cl.
CPC ......... *B65D 19/44* (2013.01); *E02D 29/0208* (2013.01); *E02D 29/0241* (2013.01)

(58) Field of Classification Search
USPC .......... 414/467, 27; 206/386, 597, 600, 494, 206/493, 746; 221/26, 29; 229/235; 211/57.1, 54.1, 59.1, 85.15, 71.01, 118
See application file for complete search history.

(56) References Cited

U.S. PATENT DOCUMENTS

| | | | | |
|---|---|---|---|---|
| 5,850,922 A | * | 12/1998 | Fraser ................. | B65D 5/5035 |
| | | | | 206/349 |
| 7,549,542 B2 | * | 6/2009 | Gasior ................. | A47F 5/0869 |
| | | | | 206/739 |
| 2008/0156683 A1 | * | 7/2008 | Heselden ............ | E02D 29/0208 |
| | | | | 206/494 |
| 2008/0247830 A1 | * | 10/2008 | Heselden ............ | E02D 29/0208 |
| | | | | 405/273 |

FOREIGN PATENT DOCUMENTS

| | | |
|---|---|---|
| GB | 2432611 A | 5/2007 |
| GB | 2445356 A | 7/2008 |
| WO | 2007060476 A1 | 5/2007 |
| WO | 2008081177 A1 | 7/2008 |

\* cited by examiner

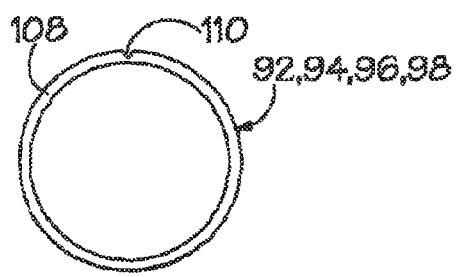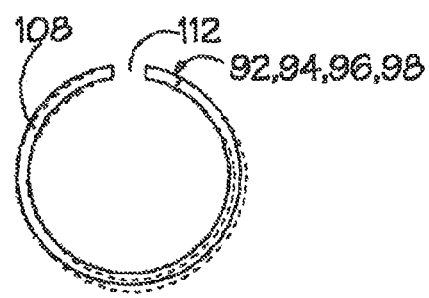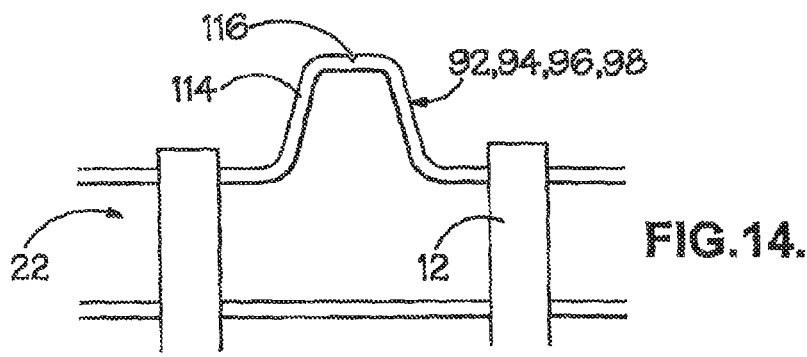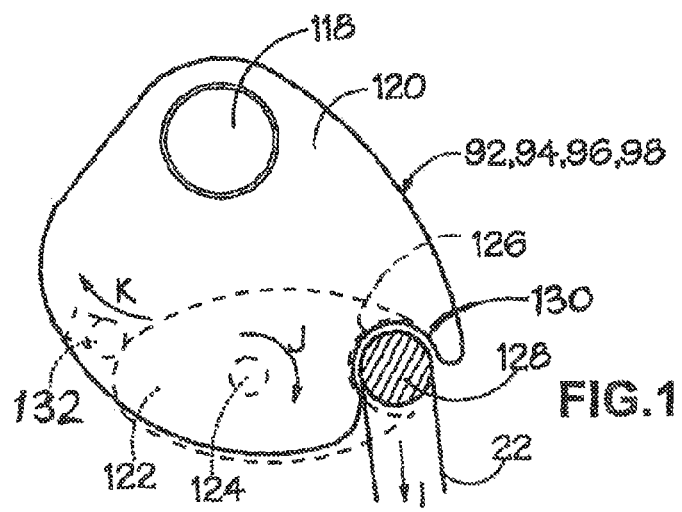

GABION DEPLOYMENT PLATFORM

CROSS-REFERENCE TO RELATED APPLICATIONS

This application is a U.S. National Phase Application under 35 U.S.C. §371 of International Patent Application No. PCT/GB2012/053275, filed on Dec. 28, 2012, which claims priority to Great Britain Patent Application No. GB 1200401.6, filed on Jan. 11, 2012; Great Britain Patent Application No. GB 1211707.3, filed on Jul. 2, 2012; Great Britain Patent Application No. GB 1212085.3, filed on Jul. 6, 2012; and Great Britain Patent Application No. GB 1215556.0, filed on Aug. 31, 2012; the disclosures of each of which are incorporated herein by reference in their entirety.

FIELD OF THE INVENTION

This invention relates to a gabion containment apparatus comprising a gabion deployment platform and in particular to improvements in and relating to storing and/or deploying gabions.

BACKGROUND OF THE INVENTION

Gabions are generally structures of the type which comprise side wall panels, end panels and partition panels which connect the wall panels, and all the panels are usually rectangular and may be pivotally attached, connected together so that the structure can be moved between an expanded (or deployed) condition for use and a collapsed (or folded) condition for storage and transport. In the deployed condition, the structure is elongated and the panels define a row of cavities extending in the length direction of the structure, each cavity being defined by side panels and partition panels, apart from the end cavities which are defined by side panels, partition panels and end panels. These cavities can be filled with ballast or building materials so that the structure turns into a robust wall which can be used for defenses for flooding, for military equipment and personnel, and for shoring of hillsides and river banks and the like, or simply as a property or other boundary. They can be used side-by-side, end-to-end or in superimposed relationship, depending upon the use to which they are to be put.

In the folded condition, the structure is basically flat and the partition and end panels lie in parallel planes, whilst the side panels of each side are folded one relative to another in zig-zag or concertina fashion, so that the plan footprint of the collapsed structure is rectangular.

It is to be mentioned that when reference is made to "rectangular" herein, square, which is one form of rectangle, is specifically to be included.

An example of a structure of the type set forth is illustrated in European Patent No. 0 466 726 B1 in FIGS. 1 and 2 thereof, and an accompanying description is also included in that Patent. A further example of a structure of the type set forth is illustrated in European Patent No. 1 951 963 B1 in FIGS. 4a to 4c, 5a to 5c and FIG. 7 thereof, and an accompanying description is also included in that Patent.

Gabions have been used throughout the world for many different uses, and often in situations where rapid deployment (to prevent flooding, or protect against hostile forces, for example) is necessary. One advantage of the pivotally attached, connected multi-compartmental gabions described in EP-B-0466726 or EP-B-1 951 963 is that they can be easily and quickly erected, and can be filled with readily available and inexpensive material, especially in those embodiments, as described in said European Patents, where the panels are of mesh and have a lining material of geo textile to prevent particles of the filling material from falling through the holes of the mesh. This mesh and lining material construction is the preferred form for the present invention, but the invention is not limited to this particular form. A further advantage of the pivotally attached, connected multi-compartmental gabions described in EP-B-1 951 963 is that they can be recovered after use.

Heretofore, gabions have been supplied on pallets and in stacks, often wrapped in shrink wrap plastics material. Whilst this has been satisfactory and will we believe continue to be satisfactory especially for smaller sizes of gabion, with the larger gabions, the removal of the shrink wrapping, the removal of the gabion from the pallet takes time, and in emergency situations, time is of the essence, and the more time which can be saved in erecting defense walls, the better.

WO 2008/081177 describes a gabion deployment system comprising a container for retaining a gabion in a folded configuration and from which the gabion can be deployed. Whilst this has been satisfactory and will we believe continue to be satisfactory, the container itself may be bulky and/or heavy and require a large amount of space in a storage facility and/or in a transport vehicle. Also, once the gabion has been deployed from the container, a user is left with an empty container which must be disposed of.

This invention seeks to achieve an improvement in this area, and to provide a means whereby the storage and/or transport of gabions (including recoverable and non-recoverable variants) can be achieved without the disadvantages of the present methods.

SUMMARY OF THE INVENTION

According to an aspect of the invention, there is provided a gabion containment apparatus for storing a folded multi-compartment gabion and from which the gabion can be deployed, the containment apparatus comprising: a base element for supporting the folded multi-compartmental gabion, the base element comprising a first member configured to extend along at least a part of a first side of said folded multi-compartment gabion, and a second member, extending transversely from said first member, said second member configured to extend along at least a part of a second side of said folded multi-compartment gabion; and at least one retaining element, coupled at a first end thereof to said base element, said at least one retaining element being releasably attached, connected or retentively engaged, at least at one point of said at least one retaining element, by way of at least one releasable attaching, connecting or retentive engaging means, to a portion of a compartment of said folded multi-compartment gabion, said at least one retaining element configured to extend from said base element, over at least a portion of said folded multi-compartment gabion, said at least one retaining element serving to attach, connect or retentively engage a part of the gabion to the base element when the gabion is folded but to release the gabion from the base element when the gabion is deployed.

According to another aspect of the present invention, there is provided a gabion of the type comprising: hingedly or pivotally attached, connected sidewalls and cross-members or partitions such that it can be folded for storage and deployed for use; and at least one releasable attaching, connecting or retentive engaging means suitable for attaching, connecting or retentive engaging the gabion to at least one retaining element of a gabion containment apparatus as described above and hereinafter; wherein the at least one releasable attaching, connecting or retentive engaging means is adapted to attach, connect or retentively engage a part of the gabion to the at least one retaining element when the gabion is folded but to release the gabion from the at least one retaining element when the gabion is deployed.

Optionally, a gabion of the above type may further comprise opposed side walls comprising a plurality of side wall elements connected together at spaced intervals by a plurality of partition walls such that spaces between neighbouring pairs of partition walls define, together with the side walls, individual compartments of the gabion, adjacent side and partition walls being connected to one another by pivotal connections enabling the gabion to be folded between fully flattened and deployed configurations, wherein at least one of the pivotal connections is a releasable connection which when released allows a side wall element to open with respect to the gabion to allow access from the side of the gabion to any contents of the gabion compartments.

Optionally, the releasable connection comprises a hinge member associated with an edge of each adjacent wall to be connected.

The pivotal interconnection between connected walls and/or wall elements may be achieved by providing interconnected walls and/or wall elements with a row of apertures along an interconnection edge thereof and by providing a coil member helically threaded through a plurality of apertures along the interconnection edge. The or each hinge member is preferably a helical spring.

The or each releasable connection optionally comprises a releasable locking member releasably securing the hinge members of each pivotal connection to one another. The pivotal connections may allow the gabion to fold concertinawise for storage or transport, for example by causing adjacent walls of the gabion to fold about a plurality of pivot axes. Specifically, the pivot axes may be spaced apart to enable adjacent walls to lie face-to-face when the gabion is in a folded configuration.

The pivotal interconnection between connected side wall elements is optionally releasable by providing the interconnected side wall elements with a row of apertures along an interconnection edge thereof and by providing a first coil member helically threaded through a plurality of apertures along the interconnection edge of a first side wall element, a second coil member helically threaded through a plurality of apertures along the interconnection edge of a second side wall element (connected to the first side wall element along the interconnection edge) and a releasable locking member threaded through overlapped first and second coil members.

Optionally, a gabion of the above type may further comprise a multi-compartmental gabion comprising opposed side walls connected together at spaced intervals along the length of the gabion by a plurality of partition walls, at least one side wall comprising a plurality of side wall elements having releasable interconnections which when released allow the side wall elements to open with respect to the gabion to allow access from the side of the gabion to any contents of the gabion compartments.

Optionally, a gabion of the above type may further comprise a multi-compartmental gabion comprising opposed side walls connected together at spaced intervals along the length of the gabion by a plurality of partition walls, the spaces between neighbouring pairs of partition walls defining, together with the side walls, individual compartments of the multi-compartmental gabion, individual compartments of the multi-compartmental gabion being bounded by opposed side wall sections of the respective opposed side walls, the partition walls being pivotally connected to the side walls, and the side wall sections of the individual compartments comprising at least one side wall element, pivotal connections being provided between neighbouring side wall elements allowing the multi-compartmental gabion to fold concertina-wise for storage or transport, the pivotal connection between at least two neighbouring side wall elements being provided by a hinge member provided on neighbouring side wall elements and by a releasable locking member releasably securing the pivotal connection by cooperating with the hinge member, whereby release of the locking member allows a first neighbouring side wall element to be disconnected from a second neighbouring side wall element and for the first side wall element thereby to move pivotally (by means of its pivotal connection with an opposite neighbouring side wall element) with respect to the compartment of the gabion bounded by the first neighbouring side wall element to open said compartment through the side wall of the gabion and allow access to any contents of said compartment.

This multi-compartmental gabion of the above type may facilitate post-deployment recovery of the gabion by providing at least one openable side wall section along the length of the gabion. Optionally, a plurality of openable side wall sections are provided. Further optionally, all of the side wall sections, except those at the ends of the gabion in a gabion having more than two compartments, are openable. Yet further optionally, all of the side wall sections along the length of the gabion are openable. By "openable" is meant that the pivotal connection between the connected side wall elements of the side wall section is provided by a hinge member provided on the connected side wall elements and by a releasable locking member cooperating with the hinge member releasably to secure the pivotal connection therebetween. In one or more embodiments of the invention, a first hinge member is provided on a first neighbouring side wall element and a second hinge member is provided on a second neighbouring side wall element, the releasable locking member cooperating with both the first hinge member and the second hinge member releasably to secure the pivotal connection. Opening of an openable side wall section is achievable by releasing the locking member and pulling apart the resulting unconnected side wall elements.

Optionally, each side wall section may comprise a single side wall element, in which case the openable pivotal connection between neighbouring side wall elements is located between neighbouring side wall sections. In this case the pivotal connection between neighbouring side wall elements and the partition wall marking the boundary between corresponding neighbouring side wall sections is also openable to allow the first neighbouring side wall element to be released both from the second neighbouring side wall element and from the partition wall. Optionally, each side wall section may comprise a plurality of side wall elements, in which case the openable pivotal connection may be provided between neighbouring side wall elements of a given side wall section. However, even when side wall sections comprise a plurality of side wall elements, openable pivotal connections may be provided between neighbouring side wall sections as well as or instead of between neighbouring side wall elements of a given side wall section. Multi-compartmental gabions comprising a plurality of side wall sections, with different numbers of side wall elements constituting different side wall sections are also contemplated.

Deployment of a gabion of the above type may be effected by transporting the folded gabion to a deployment site, unfolding or deploying the gabion from the containment apparatus and filling each individual compartment of the gabion with a fill material. Generally the fill material will be dictated at least partly by the availability of suitable materials at the deployment site. Suitable fill materials include, but are not limited to, sand, earth, soil, stones, rocks, rubble, concrete, debris, snow, ice and combinations of two or more thereof.

There are a number of reasons why it could be desirable to open side wall sections of the gabion. For example, when the deployed gabion is to be decommissioned, it may be desirable to recover the gabion for environmental or aesthetic reasons, or simply out of consideration for the local population. Recovery of the gabion of the above type may be facilitated by opening up all of the openable side wall sections of the gabion, at least partly removing the fill material from the compartments, and removing the gabion from site.

By way of further example, if the deployed gabion is damaged in use it may be desirable to replace or repair the damaged section of the gabion. Access via the openable side walls of the damaged section facilitates this. Similarly, when it is desired for reasons unconnected with damage to move, alter or replace a gabion section (for example if the position or orientation of the gabion requires alteration), such replacement is again facilitated by the capacity to remove at will fill material from selected gabion sections.

Although a gabion of the above type may be characterised by the presence of at least one openable side wall section, and optionally by a plurality of openable side wall sections, it will often be desirable to provide each individual compartment of the gabion, optionally with the exception of the end compartments of the gabion (when the gabion has more than two compartments), with openable side wall sections. Accordingly there is provided in accordance with one or more embodiments of the invention a multi-compartmental gabion of the above type wherein the pivotal connection between the connected side wall elements of each of the side wall sections, or between each neighbouring side wall section, optionally with the exception of the end side wall sections, is provided by a hinge member provided between the first side wall element of a given side wall section and a second neighbouring side wall element of the given or a neighbouring side wall section, and a releasable locking member cooperating with the hinge member releasably to secure the pivotal connection. Optionally, a first hinge member is provided on the first side wall element and a second hinge member is provided on the second neighbouring side wall element, and the releasable locking member cooperates with both first and second hinge members releasably to secure the pivotal connection.

Furthermore, although a multi-compartmental gabion will be in accordance with the one or more embodiments of the invention if a plurality of openable side wall sections are provided on one side wall, it is also contemplated that openable side wall sections may be provided on both side wall sections of an individual compartment to allow access to the fill material from both sides. Accordingly, one or more embodiments of the invention provide a multi-compartmental gabion as described wherein the pivotal connection between the connected side wall elements of at least a plurality of opposed side wall sections is provided by a hinge member provided between a first side wall element of a given side wall section and a second neighbouring side wall element of the given or a neighbouring side wall section, and by a releasable locking member cooperating with the hinge member releasably to secure the pivotal connection. Also contemplated within the scope of one or more embodiments of the invention is a multi-compartmental gabion of the above type wherein the pivotal connection between the connected side wall elements of at least a plurality of opposed side wall sections is provided by a first hinge member provided on a first side wall element of a given side wall section and by a second hinge member on a second side wall element of the given or a neighbouring side wall section and by a releasable locking member connecting the first hinge member to the second hinge member.

Also contemplated is that openable side wall sections may be provided alternately on first and second opposed side walls along at least part of the length of the gabion. In this way when a gabion is being recovered, cooperating excavating equipment or personnel can be deployed on opposite sides of the gabion to remove fill material from neighbouring compartments simultaneously or in rapid succession if simultaneous excavation is undesirable for safety or other reasons. Thus, one or more embodiments of the invention provide a multi-compartmental gabion of the above type wherein the pivotal connection between the connected side wall elements of at least a plurality of side wall sections staggered on alternating opposite side walls along at least part of the length of the gabion is provided by a hinge member provided between a first side wall element of a given side wall section and a second neighbouring side wall element of the given or a neighbouring side wall section, and by a releasable locking member cooperating with the hinge member releasably to secure the pivotal connection. Also contemplated within the scope of one or more embodiments of the invention is a multi-compartmental gabion of the above type wherein the pivotal connection between the connected side wall elements of at least a plurality of side wall sections staggered on alternating opposite side walls along at least part of the length of the gabion is provided by a first hinge member provided on a first side wall element of a given side wall section and by a second hinge member on a second side wall element of the given side wall section and by a releasable locking member connecting the first hinge member to the second hinge member.

A side wall section optionally comprises a single side wall element, or two side wall elements. However, a side wall section, a plurality of side wall sections, or each side wall section may, if desired comprise more than two side wall elements. In this case pivotal connections are optionally provided between each side wall element. Accordingly, one or more embodiments of the invention provide a multi-compartmental gabion of the above type wherein one or more side wall sections comprise a single side wall element. One or more embodiments of the invention also provide a multi-compartmental gabion of the above type wherein one or more side wall sections comprise two side wall elements pivotally connected together (preferably openably pivotally connected together). Also contemplated within the scope of one or more embodiments of the invention is a multi-compartmental gabion of the above type wherein one or more side wall sections comprise more than two side wall elements, with pivotal interconnections being provided between each neighbouring pair of side wall elements.

The multi-compartmental gabion of one or more embodiments of the invention may comprise a plurality of connected compartments, each compartment being bounded at opposed ends by a pair of opposed partition walls, and being bounded at opposed sides by a pair of opposed side wall sections, each side wall section comprising at one side wall element. In at least one, two, three or more individual compartments of the multi-compartmental gabion, at least one such side wall element is arranged to be openable, the mechanism of opening being operable when the compartment is loaded with a fill material.

The concertina-wise folding of the gabion may be effected by the side wall sections folding in towards the central longitudinal axis of the gabion, or by the side wall sections folding out away from the central longitudinal central axis of the gabion. The former manner will generally be preferable as the resulting folded gabion will have a relatively smaller cross-sectional surface area in a plane orthogonal to the central longitudinal axis of the gabion.

In an optional arrangement of one or more embodiments of the invention, the pivotal interconnection between connected walls and/or wall sections and/or wall elements is achieved by providing interconnected walls, wall sections and/or wall elements with a row of apertures along an interconnection edge thereof and by providing a coil member helically threaded through a plurality of apertures along the interconnection edge. In the case of a straightforward (i.e.—non-openable) pivotal connection, a single coil member may be helically threaded through the connection edge apertures of two (or more) neighbouring walls, wall sections and/or wall elements to achieve pivotal interconnection therebetween. Accordingly, there is provided in accordance with one or more embodiments of the invention a multi-compartmental gabion of the above type wherein at least one pivotal connection is provided by the presence of a coil member helically threaded through connection edge apertures of connected walls, wall sections or wall elements.

In another optional arrangement of one or more embodiments of the invention, the openable pivotal interconnection between connected side wall elements is achieved by providing the interconnected side wall elements with a row of apertures along an interconnection edge thereof and by providing a first coil member helically threaded through a plurality of apertures along the interconnection edge of a first side wall element, a second coil member helically threaded through a plurality of apertures along the interconnection edge of a second side wall element (connected to the first side wall element along the interconnection edge) and a releasable locking member threaded through overlapped first and second coil members. Thus, in the case of an openable pivotal connection, a pair of coil members may be helically threaded through the respective opposed connection edge apertures of two neighbouring side wall elements, and a releasable locking member inserted through the overlapped coils of the opposed pair of coil members. Accordingly, there is provided in accordance with one or more embodiments of the invention a multi-compartmental gabion of the above type wherein at least one openable pivotal connection between neighbouring side wall elements is provided by the presence of a pair of coil members helically threaded through respective connection edge apertures of neighbouring side wall elements and by a releasable locking member threaded through the respective coil members when overlapped.

Thus, there is provided in accordance with one or more embodiments of the invention a multi-compartmental gabion of the above type wherein the or at least one hinge member comprises a helical coil.

The releasable locking member may be of any suitable shape or size and may for example comprise an elongate locking pin. The pin may be provided with a gripping protrusion at one end to facilitate manual insertion and/or removal of the locking pin. The gripping protrusion may for example comprise a loop at one end of the locking pin. Accordingly there is provided in accordance with one or more embodiments of the invention a multi-compartmental gabion of the above type wherein at least one locking member comprises an elongate locking pin.

The side walls, side wall sections, side wall elements and/or partition walls preferably comprise one or more panel sections of any suitable material, for example steel, aluminium, titanium, any other suitable metal or alloy, or from a plastics, ceramic or natural material such as timber, sisal, jute, coir or seagrass. Normally, steel is preferred, in which case the steel is preferably treated to prevent or hinder steel erosion during deployment of the gabion. The panel may be a closed panel or may be a mesh panel. In the case of a closed panel, connection edge apertures where needed will normally be machined or otherwise provided in the panel edge. In the case of a mesh panel the mesh apertures may serve as connection edge apertures where needed.

Optionally, the multi-compartmental gabion of the invention comprises a cage structure.

Further optionally, the gabion comprises pivotally interconnected, optionally open meshwork, panels which are connected together under factory conditions so that the gabion can take a flattened form for transportation to site where it can be erected to take a form in which panels thereof define side, partition and end walls and an open top through which the compartments of the gabion may be filled. Optionally, under factory conditions said panels define side, partition and end walls and are pivotally interconnected edge to edge and are relatively foldable to lie face to face in the flattened form for transportation to site and can be relatively unfolded to bring the gabion to the erected condition without the requirement for any further connection of the side, partition or end walls on site.

In one or more embodiments of the invention, the side walls of the gabion each comprise a plurality of side panels pivotally connected edge to edge and folded concertina fashion one relative to another. The side walls are optionally connected by partition walls which are pivotally connected thereto, the gabion structure being adapted to be erected on site by pulling it apart by the end walls so that when it is moved from the flattened form to the erected condition the side walls unfold and define with the end walls and partition walls an elongated wall structure having a row of cavities to be filled with a fill material and of which each partition wall is common to the pair of cavities adjacent the partition wall.

In one or more embodiments of the invention the releasable locking member of the gabion of the above type may comprise means for engaging, cooperating or interfering with at least one of the hinge members or with the associated side or partition wall, and/or wherein means are provided for securing the releasable locking member to at least one of the hinge members or to the associated side or partition wall to make it more difficult to release the releasable locking member.

Optionally, the engaging or interfering means resistively engages, cooperates or interferes with said at least one of the hinge members or with said associated side or partition wall when the releasable locking member is released. This increases the amount of force required to remove the releasable locking member, making it less likely that the releasable locking member can be casually released.

The releasable connection, as described above, may be achieved by providing each adjacent wall to be connected with a row of apertures along an interconnection edge thereof and by providing a coil member helically threaded through a plurality of apertures along the interconnection edge of each wall to define the hinge member, and a releasable locking member threaded through overlapped coil members.

The releasable locking member has a proximal end and a distal end. For the purposes of the present discussion, "proximal end" means the end at which the releasable locking member would be gripped by a person or a machine to release it from the gabion. "Distal end" means the end of the releasable locking member opposite that of the proximal end. The distal end is also the end which is inserted first into the hinge members to secure them together. In an optional arrangement, the engaging or interfering means is located at the proximal end.

The walls of the gabion have a proximal edge corresponding to the proximal end of the releasable locking member. The gabion may further comprise a flexible material on an edge or surface of at least one of the adjacent walls to be connected. Such a flexible material may line the compartments of the gabion to protect them or, in the case of the gabion walls comprising mesh panels, to prevent finer fill materials, e.g. sand, from escaping from the gabion through the mesh apertures.

Optionally, the flexible material may be folded over the proximal edge of the wall and fastenably secured to the wall to define a loop of material along at least a portion of the proximal edge of the wall.

The engaging or interfering means may comprise a laterally extending protrusion which engages, cooperates or interferes with the loop of material. The laterally extending protrusion may be engagingly or cooperatively received inside the loop of material so that the protrusion cannot easily be released from the loop of material, making the releasable locking member more difficult to release.

Optionally, the portion of material is folded over and conceals said laterally extending protrusion when forming said loop. The flexible material may be folded over once the releasable locking member is in place concealing the laterally extending protrusion inside the loop so that the protrusion cannot be easily grasped and the releasable locking member cannot be casually released. This arrangement also makes it easier to engage the laterally extending protrusion inside the loop.

In another optional arrangement, the engaging or interfering means is located away from the proximal end. This would generally be preferably in cases where the gabion does not have a flexible material on an edge or surface of at least one of the adjacent walls to be connected which can engage the engaging or interfering means.

The engaging or interfering means may be located closer to the distal end than the proximal end. Locating the engaging or interfering means closer to the distal end would make it more difficult to release the locking member because the locking member would resistively engage with a greater length of the hinge member, i.e. when the hinge member comprises a coil, it would resistively engage or interfere with more of the coils of the hinge member. Locating the engaging or interfering means at or near the distal end would result in the most difficult to release locking pin and would maximise the resistive engagement between the locking member and the hinge member. Accordingly there is provided in accordance with one or more embodiments of the invention a gabion of the above type wherein the engaging or interfering means is located at or near the distal end.

The engaging or interfering means may be located closer to the proximal end than the distal end. Locating the engaging or interfering means closer to the proximal end would make it easier to release the locking member compared to locating the engaging or interfering means closer to the distal end because there would be reduced resistive engagement between the locking member and the hinge member, i.e. when the hinge member comprises a coil, the locking member would resistively engage or interfere with fewer of the coils of the hinge member.

The releasable locking member may comprise a plurality of engaging or interfering means along its length. Increasing the number of engaging or interfering means would increase the resistive engagement between the locking member and the hinge member and make it more difficult to release the locking member. In the arrangement when the hinge member comprises a coil, more than one engaging or interfering means would resistively engage or interfere with the coils of the hinge member.

Optionally, and as described above, each coil member is a helical spring. A helical spring can be threaded through the apertures at the interconnection edge and would resistively engage or interfere with the engaging or interfering means.

Optionally, the engaging or interfering means may comprise a laterally extending protrusion. Such a laterally extending protrusion would engage or interfere with a hinge member when the locking pin is released. It will be appreciated that the releasable locking member could comprise other forms of engaging or interfering means. Also contemplated within the scope of one or more embodiments of the invention is providing the releasable locking member with a roughened surface or with indentations or, indeed, with any suitable means by which the locking member would engage, cooperate or interfere with a hinge member when released.

Optionally, the engaging or interfering means operates as a ratchet. This would make it easier to insert the releasable locking member than extract it.

The ratchet may comprise a first portion closer the proximal end of the releasable locking member which extends laterally at substantially a right angle and a second portion closer the distal end of the releasable locking member which is angled acutely, wherein said first portion resistively engages a hinge member when the releasable locking member is released. The angled second portion would push more easily into the hinge member and make it easier to insert the releasable locking member.

In the arrangement when the engaging or interfering means is located away from the proximal end, the releasable locking member may be provided with gripping means at its proximal end to facilitate insertion and/or removal of the locking pin either manually or by machine. The gripping means may for example comprise a loop at the proximal end of the locking pin, as provided in WO-A-07/60476.

The releasable locking member may be of any suitable shape or size and may for example comprise an elongate locking pin.

The side walls and/or partition walls of the gabion optionally comprise one or more panel sections of any suitable material, for example steel, aluminium, titanium, any other suitable metal or alloy, or from a plastics, ceramic or natural material such as timber, sisal, jute, coir or seagrass. Normally, steel is preferred, in which case the steel is preferably treated to prevent or hinder steel erosion during deployment of the gabion. The panel may be a closed panel or may be a mesh panel. In the case of a closed panel, connection edge apertures where needed will normally be machined or otherwise provided in the panel edge. In the case of a mesh panel the mesh apertures may serve as connection edge apertures where needed.

The engaging or interfering means may be releasable by hand. In certain situations it may still be desirable that the releasable locking member is releasable by hand, for example, where tools or machines are not available to assist in releasing the locking member. However, it will be appreciated that releasing the locking pin of the invention by hand will be more difficult than releasing a locking pin which does not have the engaging or interfering means. The locking pin of the invention cannot be casually released.

The engaging or interfering means may only be releasable by machine. The engaging or interfering means may create so much resistance to releasing the locking member that it would be impossible to do so by hand so that a machine would be required.

According to another aspect of the present invention, there is provided a gabion deployment system comprising: a gabion containment apparatus, as described above and hereinafter, for retaining a gabion; and a gabion of the type in the one or more aspects, embodiments and/or optional arrangements described above and/or hereinafter.

According to another aspect of the present invention, there is provided a palletised multi-compartmental gabion comprising pivotally connected side and end walls and at least one partition wall each having first and second ends defining respectively a top and a bottom of the palletised gabion, the gabion being mounted on its bottom on a pallet and secured thereto by means of a tether extending from the pallet over an end wall of the gabion and across at least a portion of the top of the gabion and frangibly or releasably secured thereto.

The at least one retaining element may be releasably attached, connected or retentively engaged, by way of said at least one releasable attaching, connecting or retentive engaging means, at a plurality of spaced intervals to a portion of a respective plurality of individual compartments forming said folded multi-compartment gabion.

Elements of the base element and/or at least one retaining element are optionally manufactured of tough and/or strong and/or durable materials (e.g. metal or plastics).

Optionally, the base element may be configured to serve as a towable sled from which a multicompartmental gabion is deployable directly therefrom. Further optionally, the base element may comprise a nose portion located to form a front-end of said sled. The nose portion may be integral with the base element or removably attachable to said base element.

Optionally, the gabion containment apparatus may have dimensions such that it is readily transportable on a pallet, such as a pallet of dimensions 2 meters×2.2 meters. Pallet types of other dimensions may be suitable, for example, a pallet having a height of 0.125 m, a width of 0.915 m, and a length of 2.2 m.

Further optionally, an element of the gabion containment apparatus may comprise a pallet. The pallet may be arranged to form a base of the gabion containment apparatus and be configured to receive a multi-compartment gabion thereon. In such an optional arrangement, the base element may be securely attached to the pallet, e.g. by fixing a portion of the base element to the pallet using suitable connecting elements such as adhesive, screws, straps, bolts, etc. In such an arrangement, the multicompartmental gabion may be deployable directly from the pallet.

Optionally, the pallet may be configured to serve as a towable sled. Further optionally, the pallet may comprise a nose portion located to form a front-end of the sled. The nose portion may be integral with the pallet or removably attachable to the pallet.

The at least one retaining element may comprise an elongate member, and may optionally comprise for example, at least one of a bar, cable, rope or strap (such as a Velcro® strap) or any other suitable form of restraint. Parts of the gabion can be releasably attached, connected or retentively engaged to the elongate member. Further optionally, the retaining element may comprise a tether, which tether may be frangibly or releasably secured to the gabion sequentially at a plurality of locations. The retaining element may be frangibly or releasably secured directly or indirectly to the gabion. For example, at least one cooperative engagement element (which may serve as said at least one releasable attaching, connecting or retentive engaging means) may be located at each of the plurality of locations, the at least one cooperative engagement element being coupled to said gabion at the respective locations and arranged to frangibly or releasably engage the retaining element. Optionally, the respective locations may correspond to different compartments of the multi-compartmental gabion.

It is envisaged that, for example, when a multicompartmental gabion comprises five compartments, the folded gabion will be stored/transported in a gabion containment apparatus provided with four releasable attaching, connecting or retentive engaging means. A first releasable attaching, connecting or retentive engaging means may be situated to couple the at least one retaining element to a side wall between first and second compartments of the gabion. A second releasable attaching, connecting or retentive engaging means may be situated to couple the at least one retaining element to a side wall between second and third compartments of the gabion. A third releasable attaching, connecting or retentive engaging means may be situated to couple the at least one retaining element to a side wall between third and fourth compartments of the gabion. A fourth releasable attaching, connecting or retentive engaging means may be situated to couple the at least one retaining element to a side wall between fourth and fifth compartments of the gabion.

In another optional arrangement, the multicompartmental gabion may comprise eight "units", wherein each unit comprises ten cells or compartments. End compartments of adjacent units may be coupled together using suitable coupling members. Thus, a multicompartmental gabion of eighty compartments may be created by coupling together the eight units in the manner described above. In such an arrangement, a releasable attaching, connecting or retentive engaging means may be provided on each unit. The releasable attaching, connecting or retentive engaging means may be located at any point of the unit but, in a particular optional arrangement, the releasable attaching, connecting or retentive engaging means are located on a side wall of the outermost cell of each unit. Therefore, in this particular arrangement, there will be eight releasable attaching, connecting or retentive engaging means (i.e. the same as the number of units). The releasable attaching, connecting or retentive engaging means may be situated to couple the at least one retaining element to a side wall between adjacent end compartments of adjacent units of the gabion.

In an optional modification of the above-described arrangement, each unit may comprise two sub-units, each of five cells or compartments. The sub-units may be coupled to each other to form a unit in the same manner as described above. Thus, the multicompartmental gabion may be formed from sixteen five-cell sub-units. In this particular arrangement there may be a releasable attaching, connecting or retentive engaging means provided for each unit (i.e. eight) or for each sub-unit (i.e. sixteen).

However, it should be emphasised that the above-described arrangements are by way of example only, and each releasable attaching, connecting or retentive engaging means may be situated to couple the at least one retaining element to a different part of the gabion than the side wall between adjacent compartments.

Also, greater or fewer releasable attaching, connecting or retentive engaging means may be provided as required.

Optionally, the base element may comprise an L-shaped member.

The at least one releasable attaching, connecting or retentive engaging means can be of any suitable type. It is anticipated that suitable releasable attaching, connecting or retentive engaging means may comprise, amongst others:

A folded gabion compartment edge section
A frangible loop or ring
A frangible part of the gabion
A deformable member
A helical member;
A releasable line;
A clip;
A frangible coupling on, or part of, said at least one retaining element;
A frangible portion of said at least one retaining element; and
A strap (e.g. Velcro®) for releasable connection with the at least one retaining element.

Where the releasable attaching, connecting or retentive engaging means is frangible, a point of weakness, such as a notch or groove may be provided to encourage the attaching, connecting or retentive engaging means to break at a predetermined position and/or load.

Any suitable type of clip may be used, such as a carabiner-type clip or a sprung-cam type clip.

Where the at least one retaining element comprises a strap of Velcro®, the at least one releasable attaching, connecting or retentive engaging means may also comprise straps of Velcro® arranged to engage with the Velcro® of the at least one retaining element. In the particular optional arrangement described above where the multicompartmental gabion comprises eight units, Velcro® strapping may form the at least one retaining element. Eight further Velcro® straps may form the at least one releasable attaching, connecting or retentive engaging means, and each of the further eight Velcro® straps may be located at, for example, a side wall of the outermost cell of each unit.

The at least one releasable attaching, connecting or retentive engaging means is adapted to attach, connect or retentively engage a part of the gabion or unit (e.g. a side-wall of an outermost compartment of each unit) to the at least one retaining element when the gabion is folded but to release the gabion from the retaining means when the gabion is deployed. The at least one retaining element may be designed so that the releasable attaching, connecting or retentive engaging means is provided by the gabion itself, or by a section thereof. In this sense the attaching, connecting or retentive engaging means is releasable in the sense that it is capable of being released from the retaining element. In other embodiments the attaching, connecting or retentive engaging means may also or instead be releasable from the gabion itself.

The releasable attaching, connecting or retentive engaging means is preferably adapted to break (where it is frangible), disconnect (where it is a clip or Velcro®), or deform (where it is deformable) at a predetermined load, or to break or deform the retaining element of the gabion containment apparatus at a predetermined load. Optionally, the releasable attaching, connecting or retentive engaging means is adapted to break and/or release a part of the gabion when loaded by an applied force (e.g. hand or machine-assisted pulling).

Optionally, the base element is configured such that the apparatus can be stored and/or transported and/or a gabion deployed therefrom with the first member in a lowermost position, and/or such that the apparatus can be stored and/or transported and/or a gabion deployed therefrom with the second member in a lowermost position.

BRIEF DESCRIPTION OF THE SEVERAL VIEWS OF THE DRAWINGS

One or more embodiments of the invention are described further hereinafter, by way of example only, with reference to the accompanying drawings in which:

FIGS. 11b and 11c show schematically a deployment of a gabion from the apparatus illustrated in FIG. 11a;

FIGS. 12 to 16 show side views of releasable attaching, connecting or retentive engaging means.

DETAILED DESCRIPTION OF THE INVENTION

Figure 1:
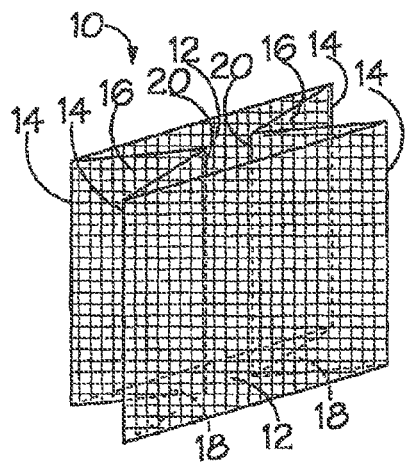
FIG. 1 shows a schematic view of a prior art single unit gabion.

Turning now to the drawings, FIG. 1 shows a schematic view of a prior art single unit gabion 10, which comprises a pair of spaced-apart end walls 12 that are hingedly 14 connected to side walls. The side walls comprise two panels each 16 and 18 that are hingedly connected to one another 20 as well as to the end walls 14. Alternative gabion designs suitable for use with the present invention comprise single-panel side walls. Side walls comprising more than two panels are also contemplated within the scope of the invention. Each wall 12, 16 & 18 is constructed from a wire mesh. The hinge connections 14 & 20 are typically helical wire members that engage corresponding edge wires of adjacent walls 12, 16 & 18. The hinges 14 & 20 are sometimes separable from the walls 12, 16 & 18 (for which see our previous application GB0424321.8). Different configurations are possible, such as providing side walls constructed from substantially closed panels rather than mesh panels.

Figure 2:
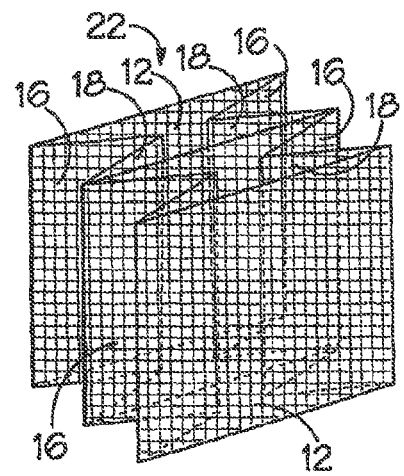
FIG. 2 shows a schematic view of a prior art multiple unit gabion in a folded configuration.
Figure 3:
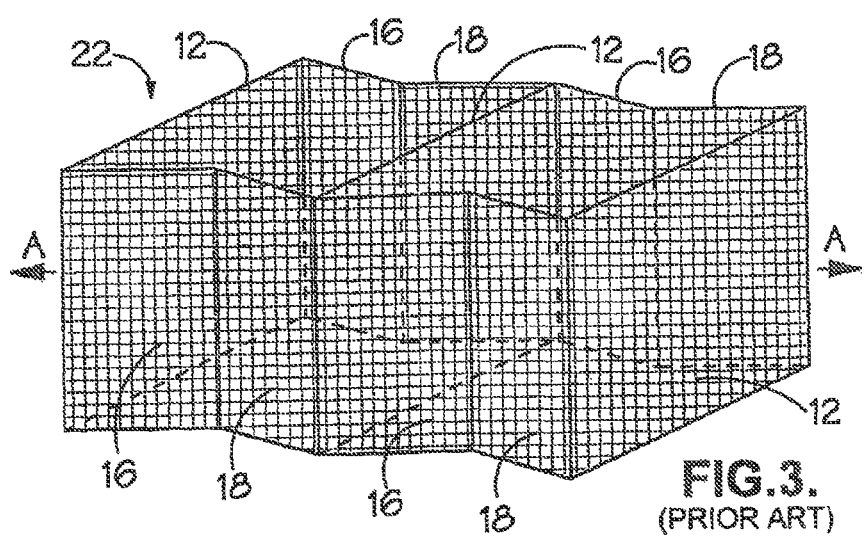
FIG. 3 shows a schematic view of a prior art multiple unit gabion in a deployed configuration.

Turning now to FIGS. 2 and 3, a prior art multiple-unit gabion is shown 22. The construction is similar to that shown in FIG. 1, with side walls 16 & 18 and an end wall 12 constituting a repeat unit that can be added as many times as necessary to produce a gabion 22 of desired length.

The gabion 22 can be stored in a folded configuration (FIG. 2) and extended to a deployed configuration (FIG. 3) by applying a tensile force as indicated by Arrows A. Conversely, the gabion 22 can be folded by applying a compressive force in the opposite sense to Arrows A.

Once deployed, a gabion can be filled with any suitable "fill" material (e.g. rocks, sand, earth, ice etc.) to produce a wall-type structure. Gabions generally have a liner (not shown) made of a sheet material to inhibit egress of filling material through the holes in the mesh.

In FIGS. 4, 5, 6, 7, 8 and 11a a gabion 22 is represented by showing only a succession of end walls 12 for clarity. The side walls are represented by dotted lines, which show that the end walls 12 are attached, connected to one another. In FIGS. 9a to 9c, 11b and 11c, folded portions of a part-deployed gabion 22 are represented by showing only a succession of end walls 12 for clarity. However, deployed portions of the part-deployed gabion 22 illustrated in FIGS. 9a to 9c, 11b and 11c are represented showing end walls 12, panels 16, 18 of side walls, and hinges 20.

Figure 4:
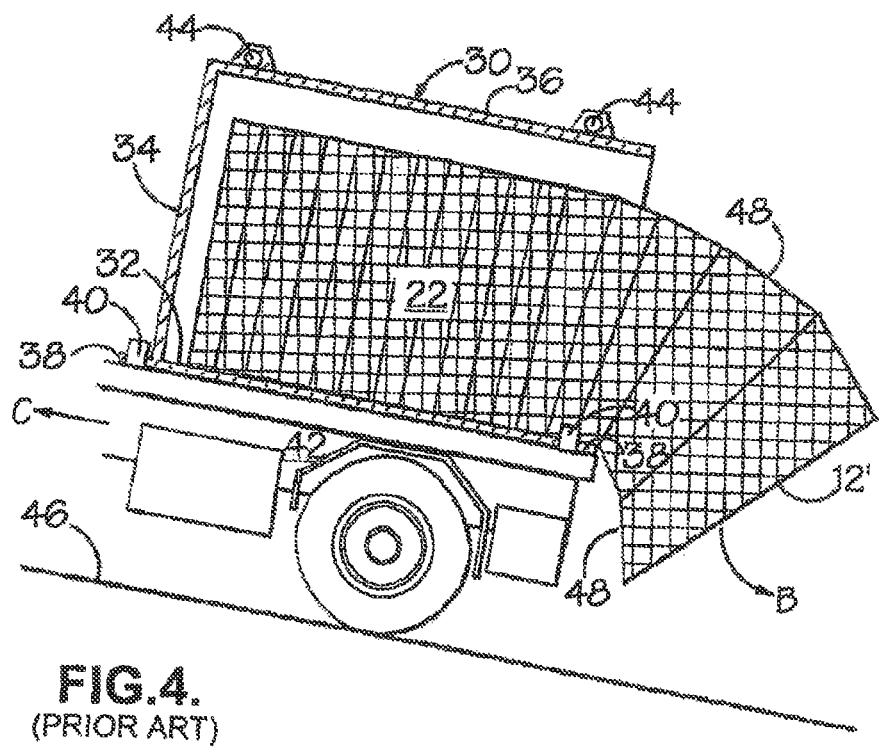
FIG. 4 shows a schematic prior art container gabion deployment system of a first type.

One convenient way of transporting gabions 22 is in containers as illustrated by FIG. 4. A container 30 generally comprises a base 32, side and end walls 34 and a roof 36. The base 32 has apertures tabs 38 that engage with pins 40 provided (in this case) on a lorry 42. The container 30 has eyelets 44 to enable it to be loaded onto and off the lorry 42 using a crane (not shown).

The gabion 22 is deployed by pulling on the first end wall 12' as indicated by Arrow B such that the gabion extends, usually in a unit-by-unit manner. The pull B can be effected by pulling on the end wall 12', holding the end wall 12' and driving the lorry in the direction indicated by Arrow C or a combination of both.

A major problem with transporting and deploying gabions 22 in this manner is that when the gabion 22 is to be deployed on inclined ground 46, there is a tendency for the gabion 22 to topple out of the container 30. Because the various parts of the gabion 22 are attached or connected to one another 48, once it has begun toppling, a large part, if not all of the gabion 22 is likely to spill out onto the ground behind the lorry 42. This can be extremely hazardous to persons nearby. A further problem is that the gabion 22 can become tangled or break, which can be inefficient, wasteful, and time-consuming to rectify.

Figure 5C:
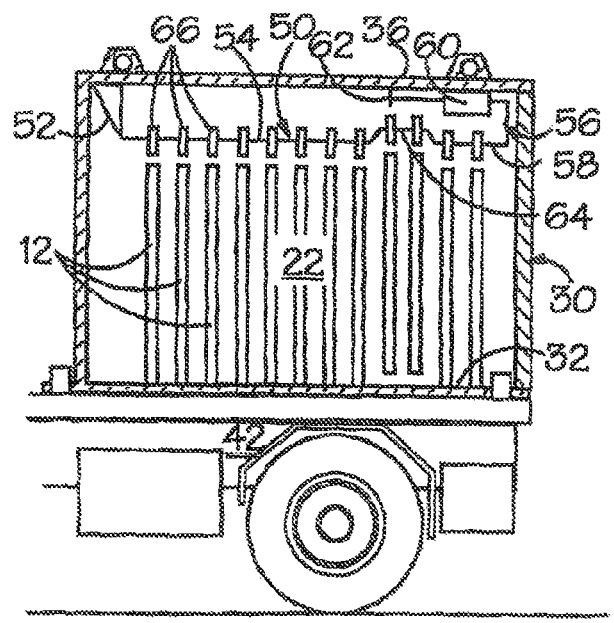
FIGS. 5a, 5b and 5c, 6 and 7 show schematic prior art container gabion deployment systems according to a second type.
Figure 5A:
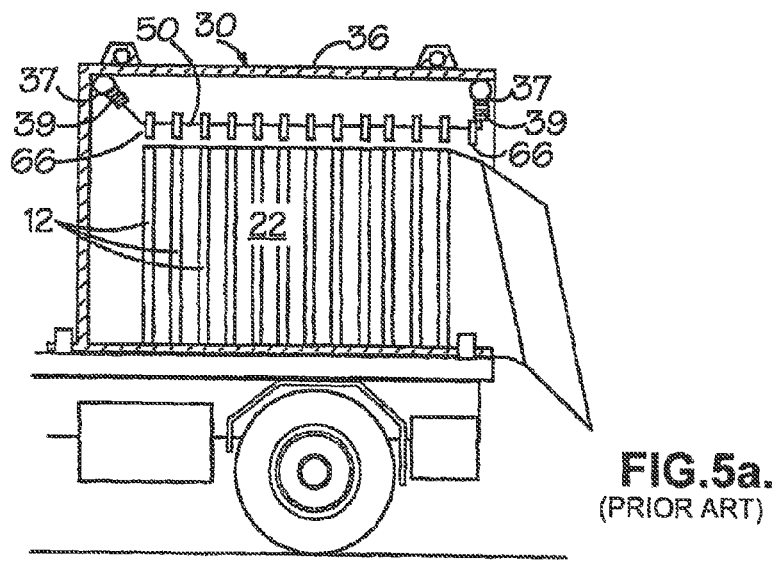
Figure 5B:
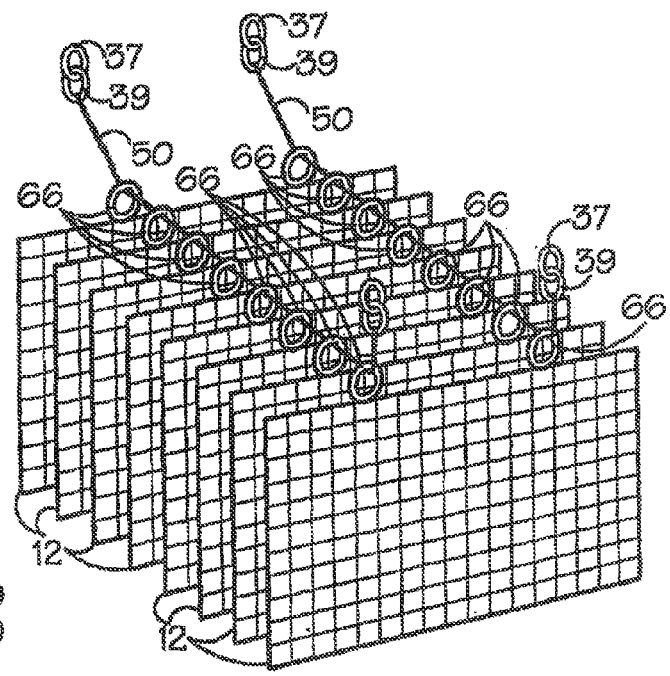
Figure 6:
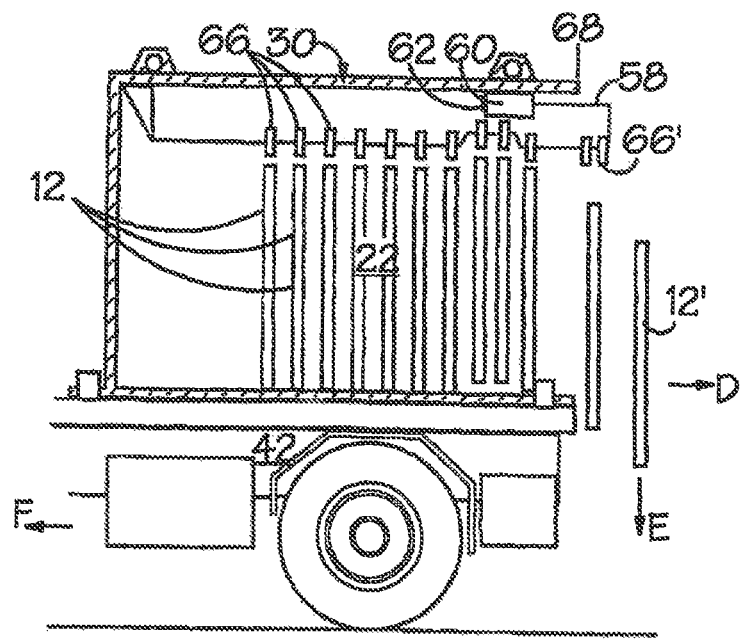
Figure 7:
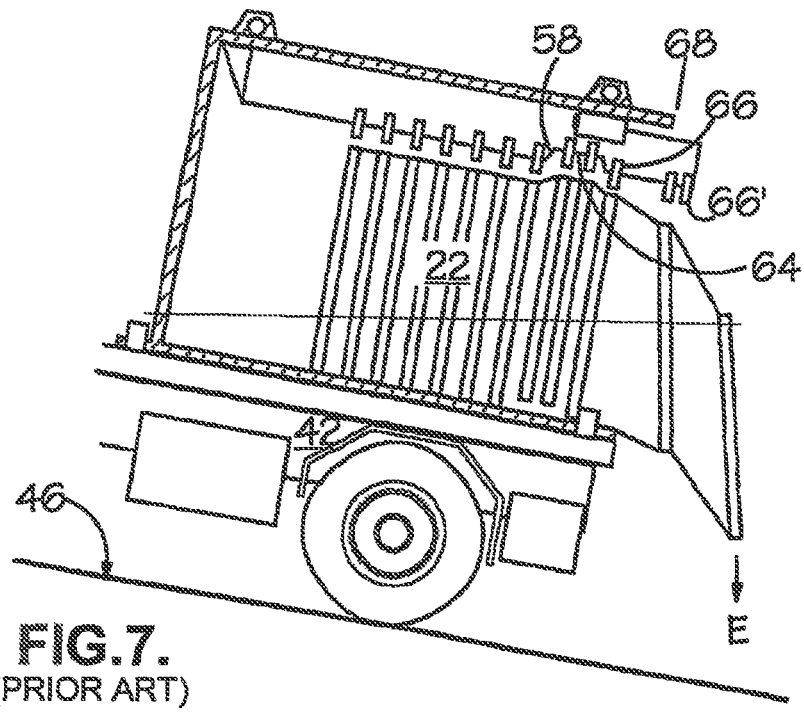

Another known way of transporting gabions 22 in containers is illustrated in FIGS. 5a to 5c, with known methods of deployment in FIGS. 6 and 7. In FIG. 5a, a container 30 is shown having a roof 36. From opposite ends of the underside of the roof 36 depend eyelets 37 to which a retaining means in the form of a retaining cable 50 is attached, connected by way of snap hooks 39. End walls 12 of the gabion 22 are attached or connected to the retaining cable 50 by way of discontinuous rings 66.

The retaining cable 50 prevents the gabion 20 from spilling out of the container 30 without the attaching, connecting or retentive engaging rings 66 first being broken or deformed.

In FIG. 5b it can be seen that each end wall 12 is provided with a pair of attaching, connecting or retentive engaging rings 66 for attaching, connecting or retentive engaging to a pair of spaced-apart and substantially parallel retaining cables 50.

It is possible to provide non-parallel retaining cables 50 for support such that the gabion 22 becomes more difficult to slide therealong as it approaches the door of the container 30.

In this prior art arrangement, gabion 22 may have been factory-assembled, provided with attaching, connecting or retentive engaging rings 66 and folded. One or more retaining cables 50 are threaded through the attaching, connecting or retentive engaging rings 66 for support and clip fasteners 39 attached, connected or retentively engaged to ends of the cable or cables 50. The gabion 22 is then loaded into a container 30 and the clip fasteners 39 attached, connected or retentively engaged to roof eyelets 37.

In FIG. 5c, the container 30 has a retaining means 50 disposed on the underside of the roof 36. The retaining means comprises an attachment 52 to which a retaining cable 54 is attached, connected or retentively engaged. An extendible/retractable attachment 56 is attached, connected or retentively engaged to the other end of the retaining cable 54. The extendible/retractable attachment 56 comprises a support bar 58 that is slidably engageable with a sheath 60. An end-stop 62 is provided to prevent the support bar from sliding beyond a desired extent. The support bar 58 depends from the sheath 60 and has an undulation 64 therein to inhibit movement of the gabion 22 therealong.

Associated with each end wall 12 of the gabion 22 is a releasable attaching, connecting or retentive engaging means 66 that connects respective end walls 12 of the gabion 22 to either the retaining cable 54 or the support bar 58. The height of the retaining cable 54 and support bar 58 is such that the majority of the weight of the gabion 22 is supported by the floor of the container.

In use, as illustrated by FIG. 6, the door of the container 30 is opened and the first end wall 12' of the gabion 22 pulled in the direction indicated by Arrow D. The support bar 58 slides beyond the periphery 68 of the container 30 such that a part of the gabion 22 is suspended beyond the periphery 68. The support bar 58 is prevented from disengaging the sheath 60 by virtue of the end-stop 62.

The releasable attaching, connecting or retentive engaging means 66 can be configured to disconnect 66' under the weight of a part of the gabion or to disconnect when an additional force E is applied thereto. Thus, the gabion 22 can be deployed unit-by-unit by a user (not shown) by first pulling a desired number of units out D, then pulling down E to release a desired number of units of the gabion 22. If the releasable attaching, connecting or retentive engaging means 66 are configured to disconnect under just the weight of the gabion 22, then the user need only pull the first unit out D and the rest will follow if the lorry 42 is advanced F.

FIG. 7 shows how the gabion neither deploys nor spills out of the container 30 when the lorry 42 is on inclined ground 46. The releasable attaching, connecting or retentive engaging means 66 are configured to support the weight of the gabion 22 thereby preventing it from spilling out unless an additional force E is applied. Furthermore, the undulation 64 in the support bar 58 limits the number of gabion units that advance beyond the periphery of the container 30, thereby limiting the load on the releasable attaching, connecting or retentive engaging means 66 to prevent additional forces E from being applied thereto.

A problem with storing and/or transporting gabions 22 in the manner illustrated in FIGS. 5a to 5c, 6 and 7 is that the container 30 adds to the weight and size of the material to be stored/transported when the gabions 22 are in a folded configuration. Also, once a gabion 22 has been deployed from container 30, a user is left with an empty container 30 with which the user may need to dispose.

Various versions of the invention are illustrated in FIGS. 8 to 11 of the drawings.

Figure 8:
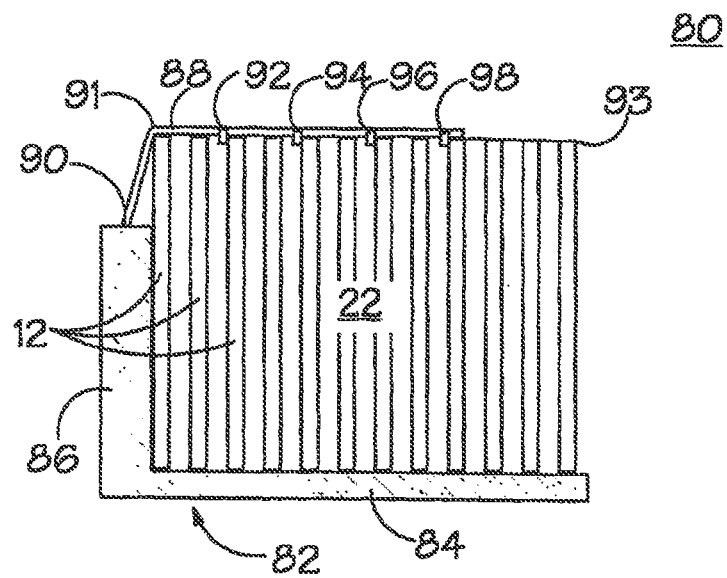
FIG. 8 shows a schematic gabion containment apparatus according to the present invention.

A gabion containment apparatus 80 according to the present invention is illustrated in FIG. 8.

The gabion containment apparatus 80 comprises a bracket 82 upon which the gabion 22 is located. The bracket 82 comprises a first plate 84 which comprises a member extending beneath the gabion 22 to support the gabion during storage/transport/deployment. A second plate 86, comprising a member extending transversely from an end of the first plate 84 is arranged to support an end of the gabion 22. The first and second plates 84, 86 are arranged in an L-shape configuration to form bracket 82.

In the illustrated arrangement, first and second plates 84, 86 comprise elongate members. However, this need not be the case, and the first and second plates 84, 86 may comprise wider or narrower members as appropriate.

A retaining element comprising a retaining strap 88 is coupled, by way of coupling element 90, to a portion of second plate 86 (e.g. an end of second plate 86 remote from the region where second plate 86 joins first plate 84). In the illustrated arrangement, the retaining strap 88 extends upwardly from the end of second plate 86, over a top end-edge 91 of the gabion 22, and across a top surface of gabion 22.

The retaining strap 88 is releasably attached, connected or retentively engaged to the top surface of gabion 22 at least at one point along the length of the strap. In the illustrated arrangement of FIG. 8, the retaining strap 88 is releasably attached, connected or retentively engaged to the top surface of gabion 22 at four points along its length by releasable attaching, connecting or retentive engaging means 92, 94, 96, 98 respectively. In a particular arrangement, releasable attaching, connecting or retentive engaging means 92, 94, 96, 98 releasably attach, connect or retentively engage the retaining strap 88 to, for example, respective end walls of a cell/compartment of each unit forming the multiple-unit gabion 22. In optional arrangements, each unit comprises ten cells/compartments. However, in other, optional, arrangements, the releasable attaching, connecting or retentive engaging means 92, 94, 96, 98 may releasably attach, connect or retentively engage the retaining strap 88 to any suitable portion of a cell/compartment of each unit forming the multiple-unit gabion 22.

In the arrangement illustrated in FIG. 8, the retaining strap 88 extends over a portion of the top surface of gabion 22 only. However, in an optional arrangement, the retaining strap 88 may extend over the entire top surface of gabion 22 and, optionally, may extend over another top end-edge 93 of gabion 22 (opposite top end-edge 91) and extend downwardly therefrom to be coupled to an end of first plate 84 remote from the point it meets second plate 86.

The retaining strap 88 and the bracket 82 serve, in combination, to prevent the gabion 22 from spilling, falling, or being inadvertently deployed from bracket 82 without the releasable attaching, connecting or retentive engaging means (hereinafter "engaging means" for brevity) 92, 94, 96, 98 first being broken, deformed, disconnected or released from engagement with the retaining element.

In an optional arrangement, the retaining strap 88 comprises a Velcro® strap and each of the engaging means 92, 94, 96, 98 comprise Velcro® straps coupled at one end thereof to parts of the gabion, and arranged for engagement with the retaining strap 88.

Although only one retaining strap 88 is illustrated in FIG. 8, optionally, multiple retaining straps may be provided in one or more of the above described configurations with respect to the gabion 22 and the bracket 82.

It is envisaged that the gabion containment apparatus 80 will be assembled in the manner illustrated in FIG. 8 in a factory. To inhibit movement of the gabion 22 relative to the bracket 82 during transport (which may cause disengagement of at least one of the engaging means 92, 94, 96, 98 from the retaining strap 88), further strapping may be provided around the gabion 22. This further strapping may be conventional strapping, e.g. plastic strapping. This further strapping can be removed prior to deployment steps. The gabion containment apparatus 80 may then be loaded onto a suitable transport vehicle for conveyance to a location at which it is to be deployed. The gabion 22 may be deployed from the folded state illustrated in FIG. 8 directly from the transport vehicle to a deployed configuration. Optionally, the gabion containment apparatus 80 may be unloaded from the transport vehicle and deployed from the gabion containment apparatus 80 located at ground level, or some other base level.

The gabion containment apparatus illustrated in FIG. 8 and described above may serve as a gabion deployment and/or packaging platform upon which a multicompartmental gabion may be packaged for storage and/or transport and also from which a multicompartmental gabion may be deployed.

Figure 9A:
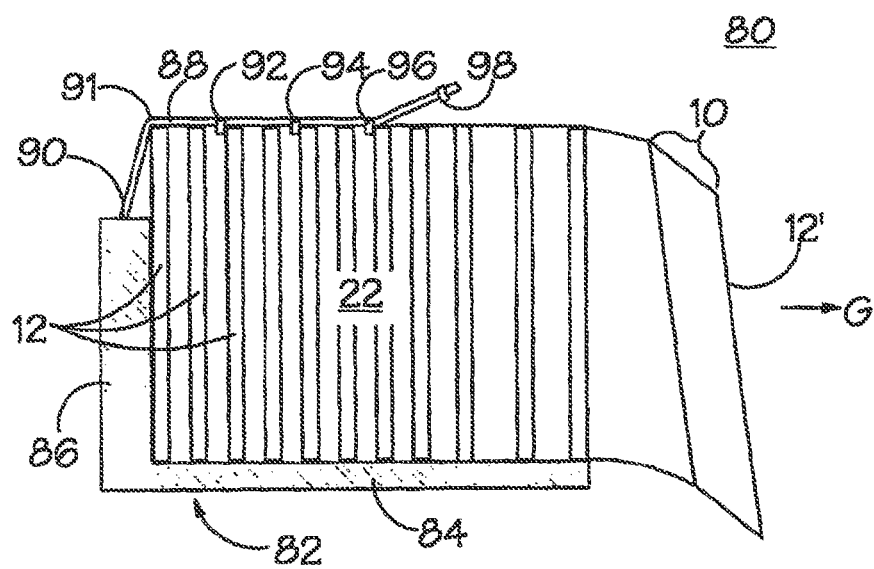
FIGS. 9a to 9c show schematically a deployment of a gabion from the apparatus illustrated in FIG. 8.
Figure 9B:
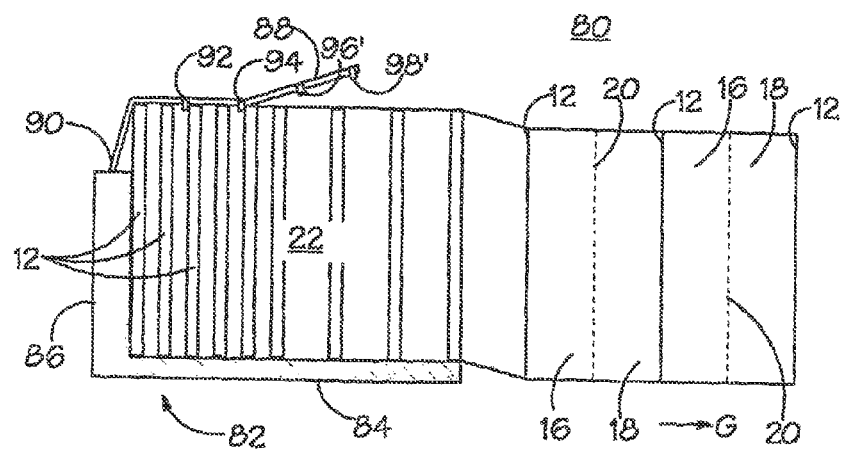
Figure 9C:
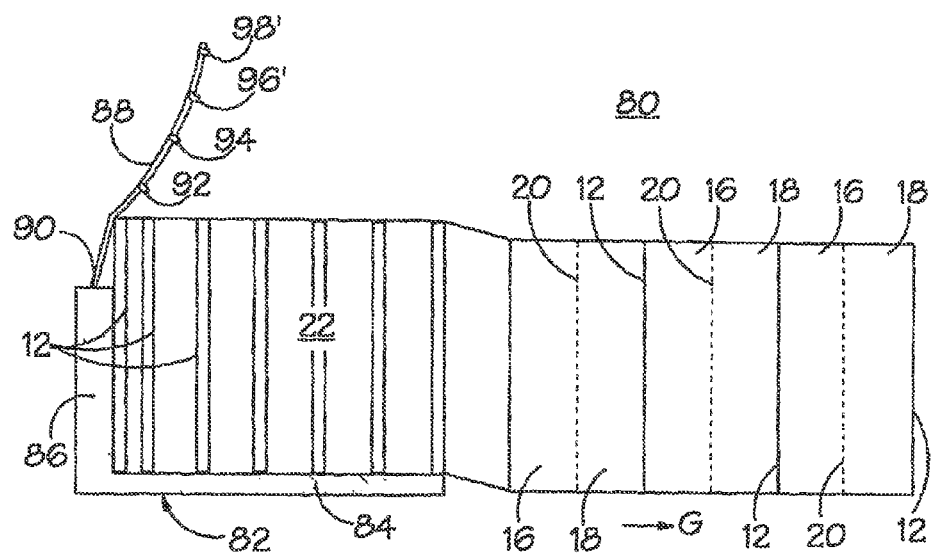

FIGS. 9a to 9c illustrate steps in a deployment process.

In FIG. 9a, a first end wall 12' of the gabion 22 is pulled in the direction indicated by arrow G. This causes at least one single unit gabion 10 of the gabion 22 to deploy from the gabion containment apparatus 80. Continued application of force in the direction indicated by arrow G causes further single unit gabions 10 of the gabion 22 to be deployed from the gabion containment apparatus 80 until a point is reached where the applied force is transferred through the deployed single unit gabions 10 to an outermost single unit gabion to which the retaining strap 88 is coupled via engaging means 98. From that outermost single unit gabion, the applied force is transferred to the engaging means 98 itself.

The engaging means 98 is configured to disconnect 98' under continued application of force in the direction of arrow G. This causes the outermost single unit gabion to which the retaining strap 88 is coupled to be released from the retaining strap 88 and allows deployment of that single unit gabion.

Continued application of force in the direction indicated by arrow G causes further engaging means 92, 94, 96 to disconnect 96' (FIG. 9b), 94', 92' (FIG. 9c) sequentially in the sequence 96, 94, 92 until the gabion 22 is free from the retaining strap 88 such that it can be pulled from the bracket 82 entirely (FIG. 9c). Thus, from the position illustrated in FIG. 9c, the gabion 22 is free to be fully deployed. This may be by continuing application of force indicated by arrow G to pull the gabion 22 free from the bracket 82 and/or may be by applying an additional force in a direction opposite to that indicated by arrow G to pull the bracket 82 from beneath the folded/part-folded portion of the gabion 22.

In an optional deployment arrangement, the bracket 82 may be used as a "skid" from which the gabion 22 can be deployed from the folded configuration (FIG. 8), through the part-deployed configurations illustrated in FIGS. 9a to 9c, to a fully deployed configuration.

In this optional deployment arrangement, at least one outermost (i.e. remote from second plate 86) single unit gabion of gabion 22 may be pulled to extend the at least one outermost single unit gabion to a fully deployed configuration. Fill material may then be added to at least one cell/compartment of this single unit gabion. This serves to anchor an end of the gabion 22. A deployment force may then be applied in a direction opposite to that indicated by arrow G in FIGS. 9a to 9c to pull the bracket 82 away from the anchored end of the gabion 22. Such a force may be applied by attaching a coupling element such as a chain, rope, etc. between bracket 82 and a suitable towing vehicle and then advancing the vehicle in a direction opposite to that indicated by arrow G. This serves to pull the bracket 82 and folded portion of gabion 22 away from the anchored end of the gabion 22. Release of the folded portion of gabion 22 from retaining strap 88 then occurs in a similar manner to that described in relation to FIGS. 9a to 9c.

Figure 10:
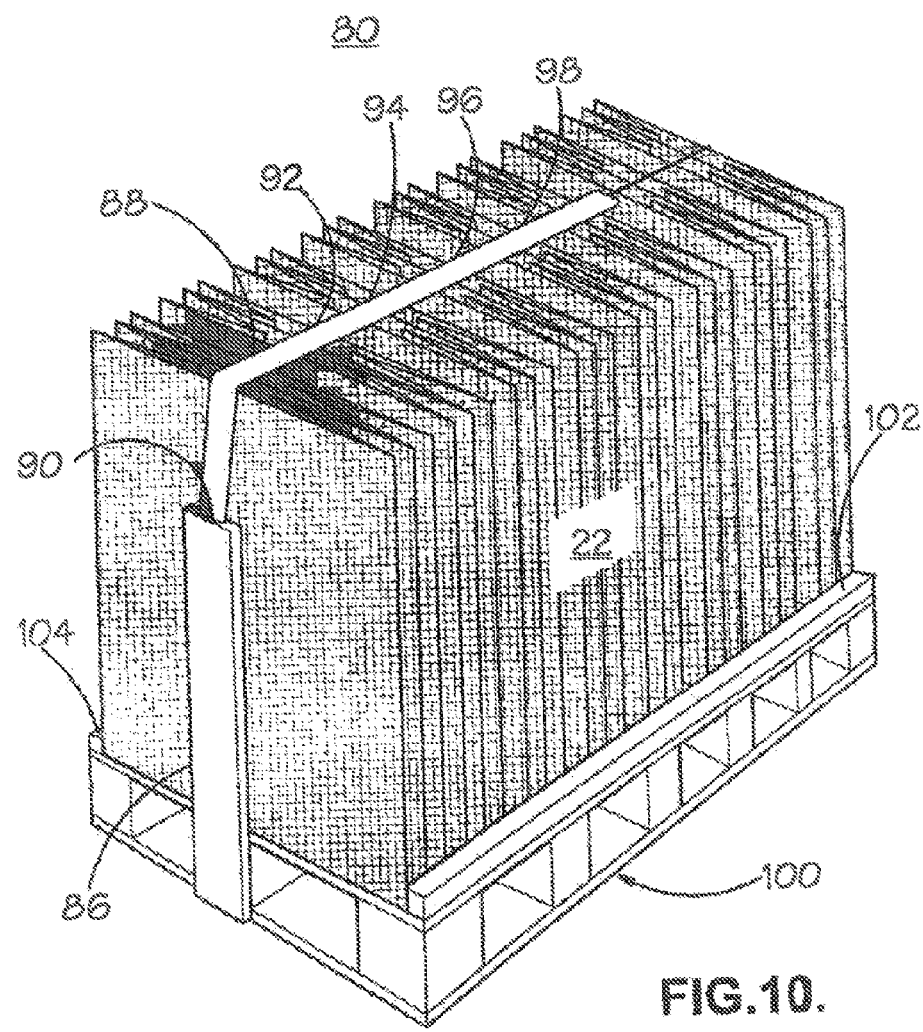
FIG. 10 illustrates a perspective view of the gabion containment apparatus of FIG. 8 mounted on a pallet.

FIG. 10 illustrates a top-perspective view of the gabion containment apparatus 80 situated on a pallet 100. This arrangement may allow for convenient movement of the gabion containment apparatus 80 by, for example, a fork-lift truck or pallet truck.

Optionally, the gabion 22 may be deployed directly from pallet 100 using one of the methods described above. In such an arrangement, the bracket may be attached to the pallet so that the pallet and bracket form an integral gabion packaging platform which may be suitable for the packaging, transport and deployment of multicompartmental gabions. In a particular arrangement, deployment may be achieved by coupling a towing vehicle to the pallet and/or the bracket using a coupling element such as a chain, rope, etc. and advancing the vehicle to apply force to the pallet and/or bracket. This serves to pull the pallet, bracket and folded portion of gabion away from the anchored end of the gabion.

In the illustrated arrangement, an upper surface of pallet 100 is provided with guide runners 102, 104 which are located adjacent edges of the pallet upper surface and which are configured to inhibit lateral movement of the gabion containment apparatus 80 relative to the pallet 100. These guide runners 102, 104 are optional features and may not be present in some arrangements.

Figure 11A:
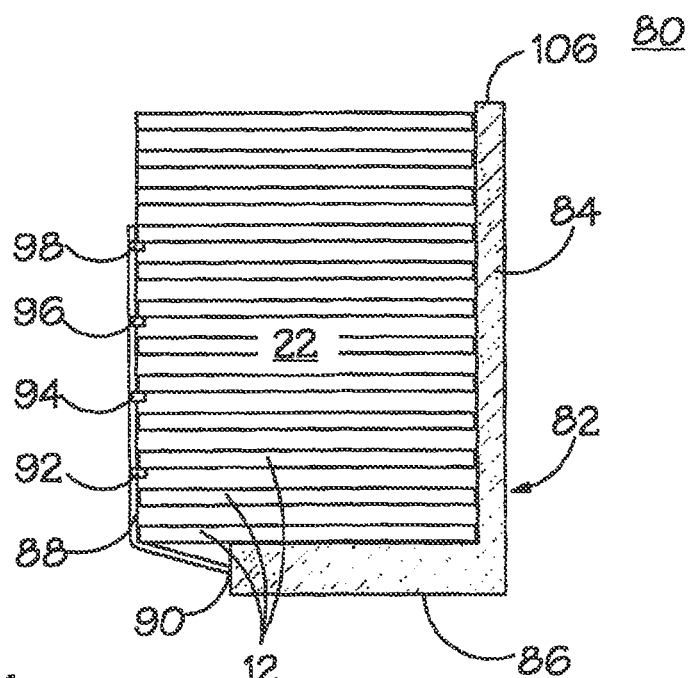
FIG. 11a shows schematic gabion containment apparatus according to the present invention in a particular orientation for storage and/or transport and/or deployment.
Figure 11B:
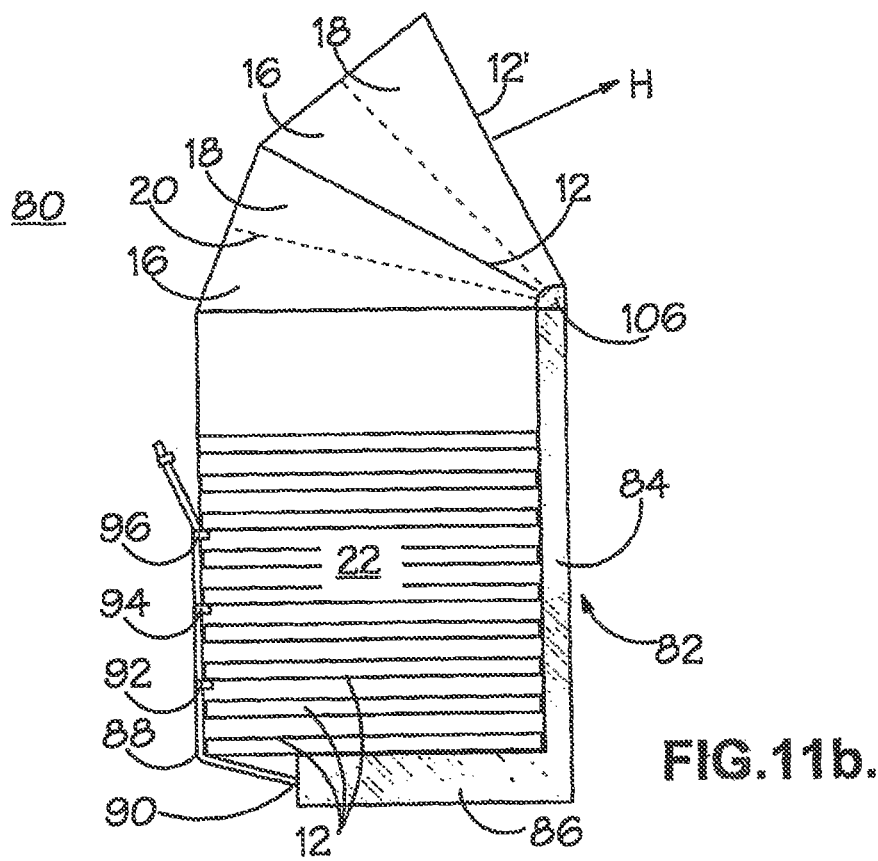
Figure 11C:
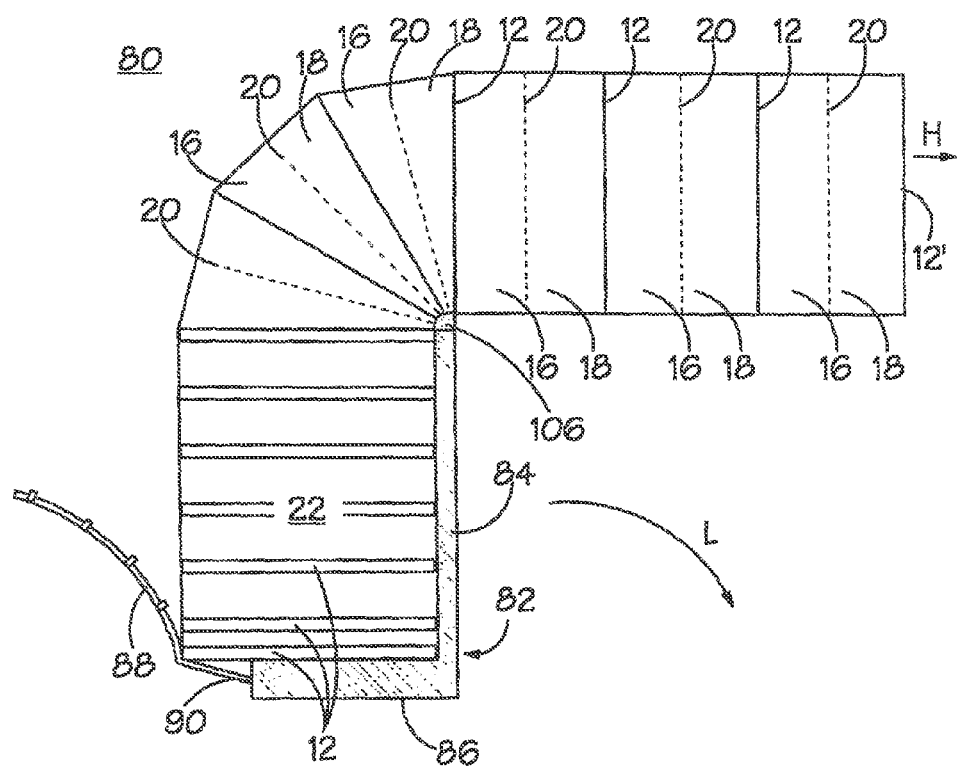

An optional gabion containment apparatus 80 storage and/or transport configuration is illustrated in FIG. 11a and an optional deployment method from the storage and/or transport configuration is illustrated in FIGS. 11b and 11c.

In the optional configuration illustrated in FIG. 11a, the gabion containment apparatus 80 is oriented such that the second plate 86 forms the base of the gabion containment apparatus 80 in a normal orientation.

This configuration may be convenient to optimise space in a storage/transport facility and/or during storage/transport in a vehicle. A particular arrangement which may be employed to try to minimise empty space in a storage container is discussed later. As will be appreciated from FIG. 10, the footprint of an end of the gabion containment apparatus 80 is smaller than the footprint of the base of the gabion containment apparatus 80 in the orientation illustrated in FIG. 10. By orienting the gabion containment apparatus 80 on its end, the space required for the gabion containment apparatus during storage/transport may be reduced.

Further, in this configuration, the gabion 22 may become compressed under its own weight and so may not extend as far along first plate 84 as it does in the configuration illustrated in FIG. 10. This may allow additional single gabion units to be added to the gabion 22 on the gabion containment apparatus 80. It will be appreciated, therefore, that the capacity of the gabion containment apparatus may be increased to carry a gabion 22 comprising more single unit gabions using this configuration.

The gabion containment apparatus 80 illustrated in FIG. 11a is similar to that described in relation to FIGS. 8 to 10, and like reference numerals denote common features. The gabion containment apparatus 80 differs from the earlier described apparatus by way of a curved lip 106 at a remote end of first plate 84 which serves to assist deployment of the gabion 22 from the gabion containment apparatus 80 in this orientation.

An optional deployment method of the gabion 22 from the gabion containment apparatus 80 in this orientation is illustrated in FIGS. 11b and 11c and occurs in a similar manner to that described above. It differs, however, in that outermost single unit gabions follow a curved path over curved lip 106 upon application of a force in a direction indicated by arrow H.

Deployment continues from the state illustrated in FIG. 11b to that illustrated in FIG. 11c under continued application of the force in the direction indicated by arrow H.

It may be the case that application of the force in the direction indicated by arrow H causes the gabion containment apparatus 82 to tip in the direction indicated by arrow L (see FIG. 11c). In this case, then deployment may continue in the manner illustrated in FIG. 9c and described above in relation to that figure.

In an optional arrangement, the gabion containment apparatus may be stored and/or transported in the configuration illustrated in FIG. 11a, i.e. with the second plate 86 in a lowermost position. However, deployment of the gabion from the gabion containment apparatus may be via the deployment steps illustrated in FIGS. 9a to 9c, and as described above, i.e. with the first plate in a lowermost position.

Turning now to FIGS. 12 to 16, various possible types of releasable attaching, connecting or retentive engaging means 92, 94, 96, 98 are shown.

In FIG. 12, the releasable attaching, connecting or retentive engaging means 92, 94, 96, 98 comprises a metal ring 108 having a notch 110 therein. The notch is configured such that it causes the ring 108 to break when a predetermined hoop-stress therein is attained.

In FIG. 13, a metal ring 108 is shown having a discontinuity 112 therein. Upon application of a force, the ring 108 deforms and the discontinuity 112 enlarges (as indicated by the dotted line) causing the gabion to be released from the retaining strap 88.

In FIG. 14, the end wall 12 of the gabion 22 has a loop 114 formed integrally therewith through which the retaining strap 88 or the like can be threaded. The loop 114 has a point of weakness 116 therein (in this case a notch) such that the loop 114 breaks under a predetermined load. The loop 114 could be formed integrally with any part of the gabion 22, such as a side wall 16, 18 or a hinge 14, 20. It is envisaged that such a feature would be provided on a portion of each single unit gabion of multi-compartment gabion 22.

FIG. 15 shows a releasable attaching, connecting or retentive engaging means 92, 94, 96, 98 in the form of a camming member. An aperture 118 is provided in the body 120 thereof through which the retaining strap 88 can be threaded. Optionally, the means 92, 94, 96, 98 of this arrangement can be fixedly located at spaced intervals on the retaining strap 88.

A cam member 122 is provided that is pivotally mounted within the body 120 about a pivot 124. One side of the cam member 122 has a cut-out 126 for receiving a part 128 of a gabion 22. The part 128 of the gabion 22 is retained by the corresponding cam member cut-out 126 and a cut-out 130 in the body 120. The cam member 122 is held in-situ by a sprung ball-bearing 132.

When an excessive load I is applied to the gabion 22, the cam member 122 rotates J and the sprung ball-bearing 132 is depressed K. The cam member 122 eventually over-centres, and the cam member cut-out 126 no longer coincides with the body cut-out 130 thereby releasing the part 128 of the gabion 22. The force I required to cause disconnection of the gabion from the releasable attaching, connecting or retentive engaging means 92, 94, 96, 98 can be configured by adjusting the compressive force applied by the sprung ball-bearing 132 to the cam member 122.

Figure 16:
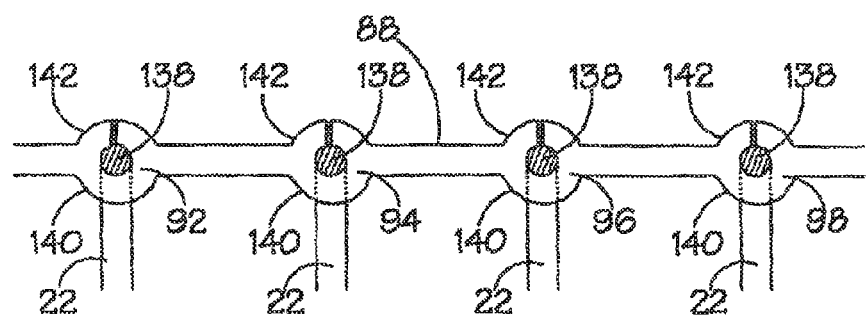

FIG. 16 illustrates an optional arrangement where a releasable attaching, connecting or retentive engaging means 92, 94, 96, 98 is integral with the retaining strap 88.

The retaining strap 88 is formed with a plurality of hoops 140 through which parts 138 of gabion 22 pass. The hoops 140 have a frangible portion 142 therein which is configured such that it causes the hoop 142 to break when a predetermined hoop-stress is attained.

Optionally, the frangible portion 142 may comprise a notch and/or a discontinuity and/or a perforation in the material of retaining strap 88.

Further optionally, the frangible portion 142 need not be coincident with the hoops 140, but rather may be formed in portions of the retaining strap 88 between hoops 140.

In further optional arrangements, the means for releasably attaching, connecting or retentively engaging the retaining strap 88 to a part, or parts, of gabion 22 may comprise any other suitable type of clip. For example, a carabiner-type clip or a sprung-cam type clip may be used.

In yet further optional arrangements, the means for releasably attaching, connecting or retentively engaging the retaining strap 88 to a part, or parts, of gabion 22 may comprise any combination of one or more of the above-described releasably attaching, connecting or retentive engaging means.

Figure 17:
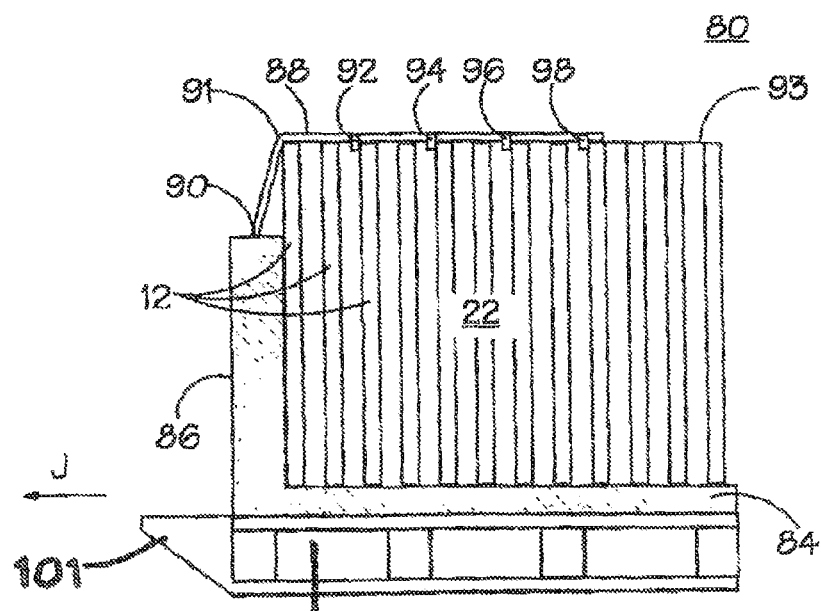
FIG. 17 illustrates a side view of a modification to the arrangement illustrated in FIG. 10.

FIG. 17 illustrates a side-view of a modification of the arrangement of FIG. 10. As with FIG. 10, FIG. 17 shows a gabion containment apparatus 80 situated on a pallet 100. This arrangement of gabion containment apparatus 80 and pallet 100 may form an integral gabion packaging platform from which the gabion may be deployed directly. In such an arrangement, deployment may be achieved by coupling a towing vehicle to the pallet and/or the bracket using a coupling element such as a chain, rope, etc. and advancing the vehicle to apply force to the pallet and/or bracket. This serves to pull the pallet, bracket and folded portion of gabion away from an anchored end of the gabion in a direction indicated by arrow J.

The pallet serves as a skid or sled which is effectively dragged across terrain as the vehicle is advanced.

In the illustrated arrangement, the pallet 100 is provided with a nose 101. The nose 101 is located at the towing end, or front end of the pallet (i.e. the end of pallet 100 which is at the front when the pallet is moved in the above-manner). An underside of the nose 101 is arranged to form a continuous surface with the underside of the pallet and extends at an angle and/or extends as a curve upwardly from a lower front edge of the pallet 100. This upwardly angled/curved surface is configured to allow the nose 101 to ride-up over obstacles in the path of the pallet 100 when it is being pulled over terrain. Thus, it may serve to ease the passage of the pallet 100 over terrain, particularly rough and/or uneven terrain.

The nose 101 optionally forms part of the pallet 100, i.e. it is integral with the pallet 100. In another optional arrangement, the nose 101 comprises a detachable element which can be fixedly attached to the pallet using any suitable fixing means and/or optionally by push-fitting the nose 101 onto an end of the pallet 100. In such an arrangement, the nose 101 may be attached to the pallet 100 prior to a gabion deployment process, and may be removed thereafter, e.g. for re-use with other pallets.

In yet another optional arrangement, the nose 101 forms part of the bracket 82, i.e. it is integral with the bracket 82. It is envisaged that the nose 101 would extend from the bracket 82 adjacent a region where the first plate 84 joins second plate 86. This arrangement may be convenient for the deployment arrangement discussed above in relation to FIGS. 8 and 9a to 9c, i.e. where the bracket 82 may be used as a "skid" or sled from which the gabion 22 can be deployed from the folded configuration (FIG. 8), through the part-deployed configurations illustrated in FIGS. 9a to 9c, to a fully deployed configuration.

Again, however, the nose 101 need not be integral with the bracket 82 and may, optionally, comprise a detachable element which can be fixedly attached to the appropriate part of the bracket 82 using any suitable fixing means and/or optionally by push-fitting the nose 101 onto a portion of the bracket 82. In such an arrangement, the nose 101 may be attached to the bracket 82 prior to a gabion deployment process, and may be removed thereafter, e.g. for re-use with other brackets.

The nose 101 may be constructed from suitably rugged materials which can withstand buffeting and/or impacts with stones, rocks, tree-stumps, and other types of debris and/or vegetation which may be encountered when the pallet 100 is pulled over terrain. In an optional arrangement, the nose 101 may be formed from steel plates.

In a particular optional arrangement, the nose 101 may comprise an elongate upper plate element. The upper plate element comprises four edges, with first and second side edges being opposite to each other, and leading and trailing edges being opposite to each other and extending transversely between said first and second side edges. First and second side plate elements may extend transversely downwards from first and second side edges respectively of the upper plate element. A bottom plate extends downwardly, at an angle and backwards from the leading edge. The bottom plate is arranged to form an underside of the nose 101. As noted above, the nose 101 may be located at an end of the pallet 100 by push-fitting the nose 101 onto the end of the pallet 100. In an optional arrangement, a rear plate may extend from the trailing edge transversely downwards toward an edge of the bottom plate remote from the leading edge. The nose 101 may be fixed to the end of the pallet 100 by fixing the rear plate to the end of the pallet 100 using suitable fixing means.

The nose 101 may also serve to protect the front end of the pallet 100 from damage which may be caused through buffeting and/or impacts with stones, rocks, tree-stumps, and other types of debris and/or vegetation which may be encountered when the pallet 100 is pulled over terrain. This may allow the pallet 100 to be re-used.

In a particular optional arrangement, a height of the multicompartmental gabion may be 1 m. It may be desirable to employ as a pallet forming part of the gabion containment apparatus, a pallet of the following dimensions: height 0.125 m, width 0.915 m, length 2.2 m. With the multicompartmental gabion located upon the pallet, the overall height of the package is 1.125 m. The width of the package is 0.915 m and the length of the package is 2.2 m. It may be convenient to use pallets of the above dimensions and multicompartmental gabions of the above height for the purposes of logistical efficiency. For example, pallets and multicompartmental gabions dimensioned as described may be selected to minimise empty space within a conventional shipping container when a number of packages are located within a conventional shipping container. A conventional shipping container (e.g. intermodal container) may have an internal width of around 2.4 m and an internal height of 2.5 m. Different length containers are available. A package of the above-dimensions may be located within such a container so as to fit by extending lengthwise across the width of the container. With a first package located upon the floor of the container adjacent a rear wall of the container, a further package can be stacked upon the first package. Additional pairs of packages in the same configuration can be located in front of the first pair of packages from the rear of the container toward the doors of the container. It may be possible to fit packages of the above-dimensions in standard containers using multiples of the above arrangements to minimise empty space.

In another optional arrangement, the gabion containment apparatus may be suitable for storing, transporting, and allowing deployment therefrom, a multi-compartmental gabion of a first form of the recoverable type. Such a multi-compartmental gabion comprises pivotal connections between neighbouring compartments and openable pivotal connections between neighbouring side wall elements. Locking pins may be used to lock together the openable pivotal connections between neighbouring side wall elements.

In another optional arrangement, the gabion containment apparatus may be suitable for storing, transporting, and allowing deployment therefrom, a multi-compartmental gabion of a second form of the recoverable type. The second form of multi-compartmental gabion of the recoverable type may comprise opposed side walls connected together at spaced intervals along the length of gabion by a plurality of partition walls defining, together with side walls, individual compartments of multi-compartmental gabion. Individual compartments of the multi-compartmental gabion may be bounded by opposed side wall sections of the respective opposed side walls. Partition walls are pivotally connected to side walls at hinge points. However, unlike the recoverable gabion of the first form referred to above, each side wall section of the second form comprises a single side wall element, with openable pivotal connections being provided at the junction between the side wall sections and the partition walls, and secured by locking pins. The locking pins may be removed to allow the side wall elements to be moved pivotally to open the gabion compartment from the side.

Pivotal connection between side wall sections (and/or partition walls) in recoverable gabions of the first and second forms referred to above may be effected by a helical coil which is helically threaded through mesh apertures of neighbouring wall panels.

Any references made herein to orientation (e.g. top, bottom, front and back) are made for the purposes of describing relative spatial arrangements of the features of the apparatus, and are not intended to be limiting in any sense.

The invention claimed is:

1. A gabion deployment system comprising: a foldable multi-compartmental gabion and a gabion deployment platform for retaining a foldable multi-compartmental gabion;
the gabion deployment platform comprising:
a base element for supporting the foldable multi-compartmental gabion, the base element consisting of a first member configured to extend along at least a part of a first side of said foldable multi-compartmental gabion, and a second member, extending transversely from said first member, said second member configured to extend along at least a part of a second side of said foldable multi-compartmental gabion; and
at least one retaining element, coupled at a first end thereof to said base element, said at least one retaining element being releasably attached, connected or retentively engaged, at least at one point of said at least one retaining element, by way of at least one releasable attaching, connecting or retentive engaging means, to a portion of a compartment of said foldable multi-compartmental gabion, said at least one retaining element configured to extend from said base element, over at least a portion of said foldable multi-compartmental gabion, said at least one retaining element serving to attach, connect or retentively engage a part of the foldable multi-compartmental gabion to the base element when the foldable multi-compartmental gabion is folded but to release the foldable multi-compartmental gabion from the base element when the foldable multi-compartmental gabion is deployed; and
the foldable multi-compartmental gabion comprising: hingedly or pivotally attached, connected sidewalls and cross-members or partitions such that it can be folded for storage and deployed for use; and the at least one releasable attaching, connecting or retentive engaging means suitable for attaching, connecting or retentively engaging the portion of the compartment of the foldable multi-compartmental gabion to the at least one retaining element of the gabion deployment platform; wherein the at least one releasable attaching, connecting or retentive engaging means is adapted to attach, connect or retentively engage a part of the foldable multi-compartmental gabion to the at least one retaining element when the foldable multi-compartmental gabion is folded but to release the foldable multi-compartmental gabion from the at least one retaining element when the foldable multi-compartmental gabion is deployed.

* * * * *